July 15, 1958  H. W. HABGOOD  2,843,219
REMOVAL OF NITROGEN FROM NATURAL GAS
Filed Jan. 22, 1957  3 Sheets-Sheet 3

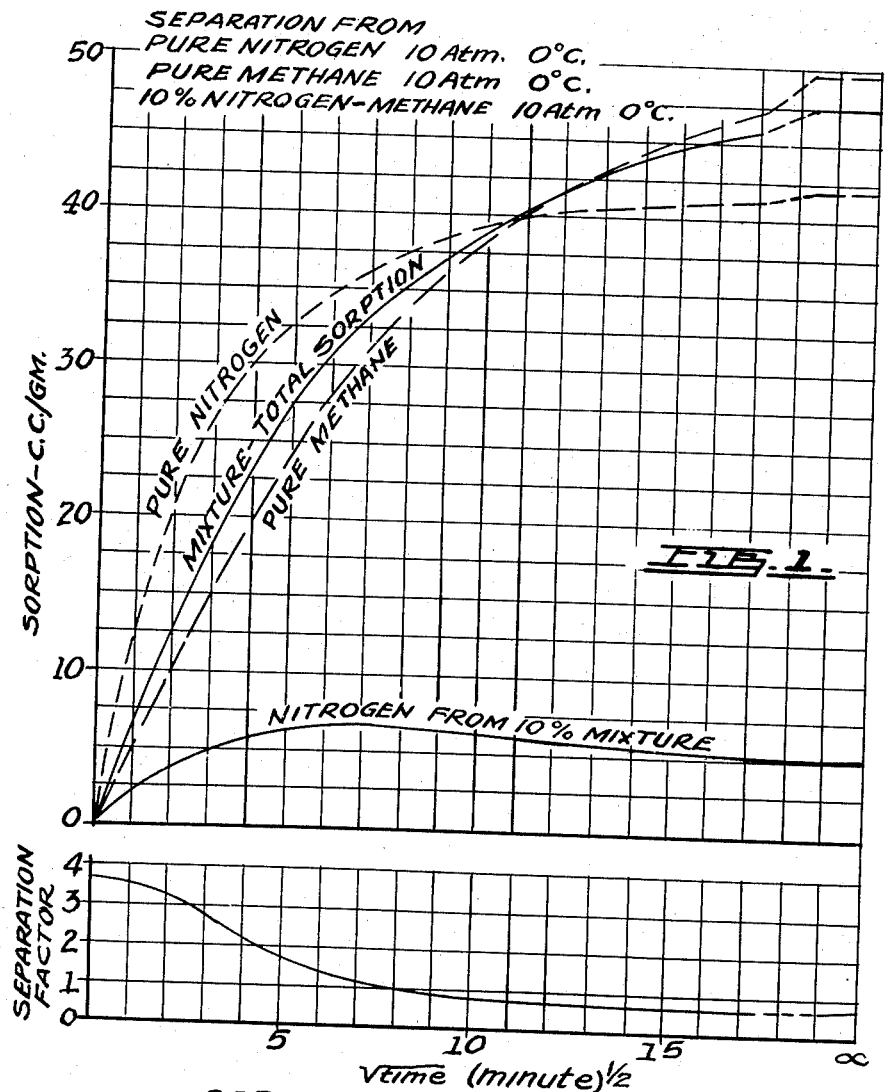

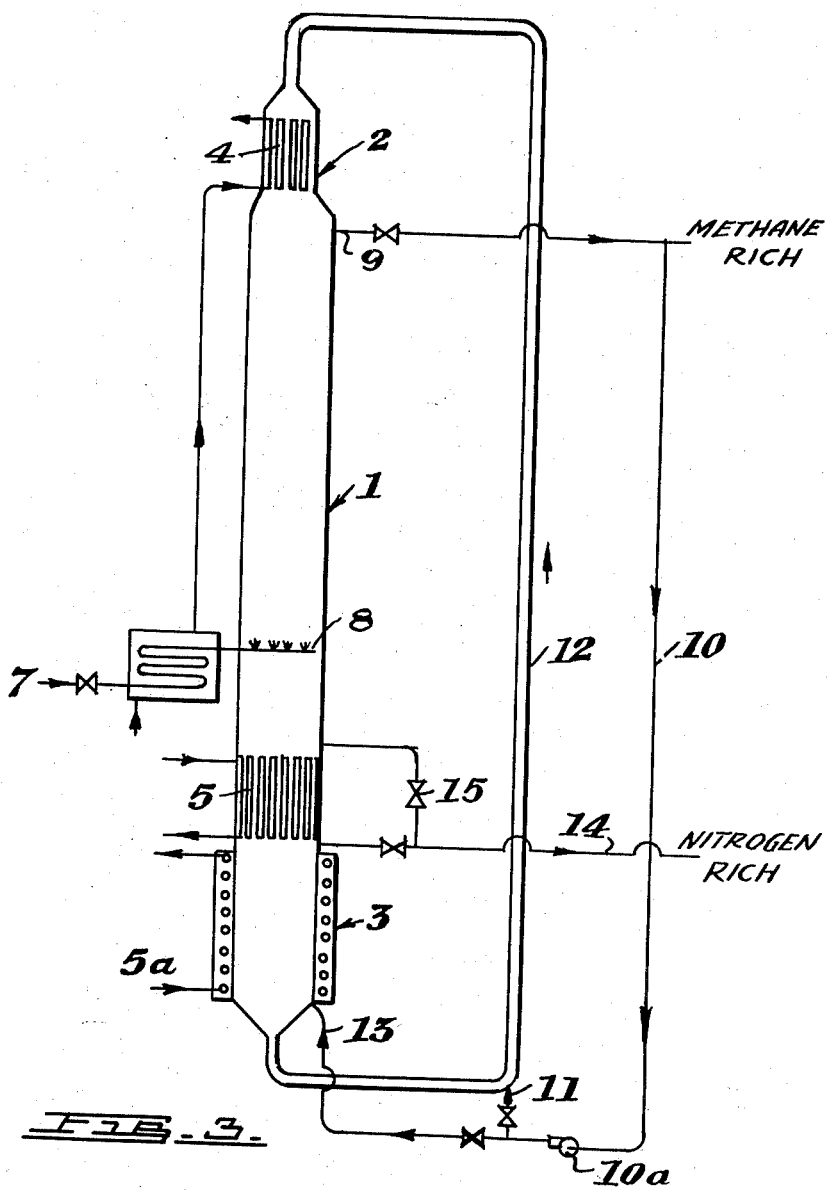

INVENTOR
HENRY W. HABGOOD
By Smart+Biggar
ATTORNEYS

2,843,219
REMOVAL OF NITROGEN FROM NATURAL GAS

Henry W. Habgood, Edmonton, Alberta, Canada, assignor to Canadian Patents and Development Limited, Ottawa, Ontario, Canada Application January 22, 1957, Serial No. 635,232

10 Claims. (Cl. 183—114.2)

This invention relates to the purification of natural gas, and more particularly to the removal of nitrogen from natural gas by use of a molecular sieve.

The removal of nitrogen from natural gas is of considerable importance in many phases of the technology of natural gas. Nitrogen, which is present in many natural gases to a significant extent, lowers the heating value of the natural gas and increases the transportation costs based on unit heating value. Present statistics indicate that the average nitrogen content of all natural gases in the United States is approximately 8%, with some fields having up to 16%. The removal of nitrogen is particularly advantageous when the gas is to be transported long distances by pipeline. The presence of 10% nitrogen in effect increases the transportation cost by 10%.

Natural gas consists principally of methane, and the methods heretofore known for its purification may be divided roughly into three classifications:

(a) Methods involving fractional distillation at low temperature and (usually) high pressure. Since nitrogen has a lower boiling point than methane and the other hydrocarbons present in natural gas, it may be removed as a gas on liquifying the remaining constituents which are then revaporized.

(b) By selective adsorption of the methane and higher hydrocarbons on an adsorbent such as activated charcoal. The adsorbed gases are then desorbed to give a gas free of nitrogen.

(c) Miscellaneous processes involving selective diffusion through a series of organic membranes, formation of lithium nitride by treatment with lithium amalgam, absorption of the nitrogen in liquid ammonia or in liquid sulphur dioxide.

The principal disadvantage of the fractional distillation and adsorption processes is that they remove the major component, methane, from the minor component, nitrogen, instead of the reverse. Since the separation takes place at low temperatures and high pressures, almost the entire volume of natural gas must be refrigerated, usually compressed, and then heated again. These operations make the processing costs unduly high. The processes suggested under paragraph (c) above are handicapped by an unsatisfactory degree of separation or by the use of too expensive materials.

It is an object of the present invention to provide a relatively inexpensive method for the purification of natural gas.

It is a further object of the present invention to provide a method for the removal of the minor component of natural gas, nitrogen, from the major component thereof, methane.

It is a still further object of the invention to provide a method for the removal of nitrogen from natural gas which involves the sorption of the nitrogen in a molecular sieve.

The term "molecular sieve" might be applied to a dialysis membrane or even to a substance such as urea in solution which forms adducts with straight chain hydrocarbons. For the purposes of this specification however, it should be understood that the term "molecular sieve" applies only to solid sorbents.

Suitable molecular sieves are formed by the dehydration of certain crystalline zeolites, and have a rigid three-dimensional open cage structure with a network of channels of molecular dimensions. Barrer's United States Patent No. 2,306,610, issued December 29, 1942, discloses the use of crystalline zeolites having rigid three-dimensional anionic networks for fractionating hydrocarbon mixtures such as butane and isopentane, or heptane and toluene.

It has now been discovered, using a dehydrated crystalline zeolite such as mordenite, synthetic mordenite, or Linde Molecular Sieve 4A (a synthetic zeolite (sodium aluminum silicate) manufactured by Linde Air Products Company), that nitrogen is initially sorbed relatively more rapidly from a mixture of methane and nitrogen, although the ultimate sorption is higher for methane than for nitrogen. Thus the separation depends on the initially faster nitrogen sorption when the natural gas (considering it as being a mixture of methane and nitrogen) is passed through a bed of fresh molecular sieve consisting of one of the materials above described. The desorbed gas which is substantially enriched in nitrogen may be treated in a second stage of sorption by a molecular sieve to remove additional nitrogen or by a bed of activated charcoal to adsorb the methane. Since the preferential sorption of nitrogen occurs only in the initial stages, i. e. before equilibrium is approached, it is necessary that the flow of gas be directed to a fresh supply of molecular sieve material when the relative sorption of methane has increased to a predetermined level.

Thus there is provided, according to the present invention, a method for the removal of nitrogen from gaseous mixtures consisting mainly of methane, comprising: contacting the gaseous mixture with a suitable molecular sieve in which the interstitial and intracrystalline passages are such that the ratio of the rate of sorption to partial pressure is initially greater for nitrogen than for methane; removing the gaseous mixture from contact with said molecular sieve material before the proportion of sorbed methane to sorbed nitrogen exceeds a predetermined value and before equilibrium is approached; and recovering an unsorbed fraction of said gaseous mixture which is rich in methane and which contains a substantially reduced proportion of nitrogen.

It is desirable that a fraction of the gaseous mixture which is relatively rich in nitrogen be regenerated from the molecular sieve material, and that the sieve material be reused for the purpose of sorption. This may be accomplished in any one of a variety of ways, two of which are illustrated below with reference to Figures 4 and 5.

It will be apparent to those skilled in the art that changes in either temperature or pressure will affect the process for removal of nitrogen from gaseous mixtures described above. Various temperatures and pressures may be chosen according to the circumstances under which the process is carried out at any particular time.

In the accompanying drawings:

Figure 1 illustrates typical sorption vs. $\sqrt{\text{time}}$ curves for pure methane, pure nitrogen, and a 10% nitrogen methane mixture at 0° and a pressure of 10 atmospheres using Linde Molecular Sieve 4A.

Figure 2 illustrates the variation of the separation factor vs. $\sqrt{\text{time}}$ for the same mixture as shown in Figure 1. The separation factor, $\alpha$ (sometimes called the relative volatility), is defined by analogy to distillation processes as $$\alpha N_2 = \frac{(\text{mole fraction } N_2/\text{mole fraction } CH_4) \text{ sorbed phase}}{(\text{mole fraction } N_2/\text{mole fraction } CH_4) \text{ gas phase}}$$

These two figures illustrate the principle of the separation. The freshly out-gassed sieve initially sorbs a relatively greater proportion of nitrogen but with time this changes to an enrichment in methane which is the equilibrium condition.

Figure 3 is a diagrammatic side view of an apparatus suitable for the separation of nitrogen and methane on a continuous basis, the flow of natural gas being countercurrent to the flow of the sorbent bed;

Figure 4:
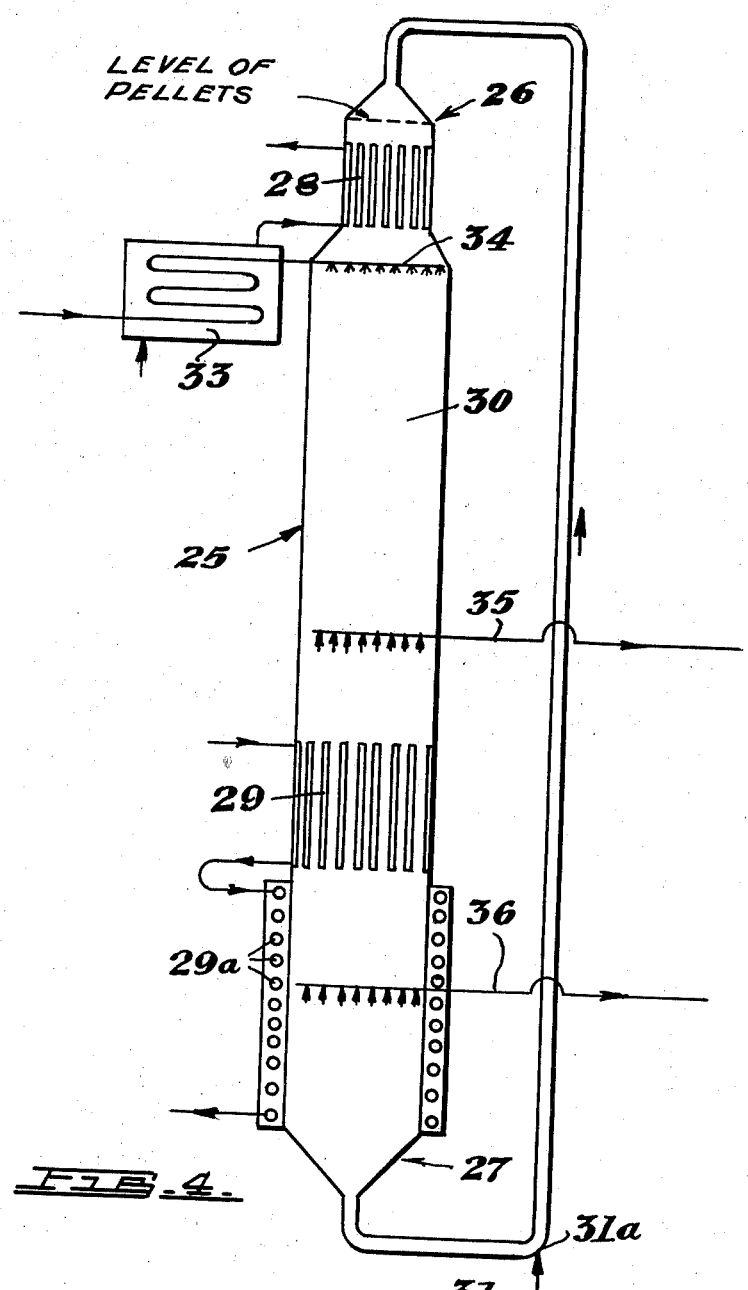
Figure 4 is a diagrammatic side view of an apparatus suitable for the removal of nitrogen from natural gas, wherein the flow of natural gas is co-current with the flow of the sorbent bed.

The invention will be further described by reference to the following specific examples which are given by way of illustration.

EXAMPLE 1

Measurements of the amount and rate of sorption of pure nitrogen were made on Linde Molecular Sieve 4A at several pressures and temperatures. Figures 1 and 2 illustrate the results for a 10% nitrogen-methane mixture and for the pure gases at 10 atmospheres and 0°. These are conditions which would be promising for commercial operation. Referring to Figure 1, the sorption-time curves are qualitatively similar to those found at low pressure and to those previously reported for other systems at low pressures, i. e. an initial portion linear with respect to $\sqrt{\text{time}}$, the slope for pure nitrogen being two to three times greater than that for methane, followed by a crossing over to give greater equilibrium sorption of methane. From the 10% mixture the rate of sorption of the nitrogen is about 28% of the total sorption rate. Consequently, during the initial stage of sorption the ratio of nitrogen to methane which is 1:9 in the gas phase, is 28:72 in the sorbed phase and the separation factor which is defined above is therefore $$N_2 = \frac{28/72}{1/9} = 3.5$$

If the sorption is allowed to go to equilibrium the total amount of sorbed nitrogen passes through a maximum and then decreases slightly while the proportion of nitrogen in the sieve decreases steadily to an equilibrium value of about 7.5% and the separation factor falls to around 0.68. Thus the final equilibrium represents a concentration of methane on the sieve as opposed to the initial concentration of nitrogen.

The separation factor increases with decreasing temperature and increases slightly with increasing pressure. The overall rate of sorption increases with pressure as does the capacity of the sieve (both the ultimate capacity and the "useful" capacity, i. e. capacity until the separation factor starts to fall off significantly). The effect of temperature on the overall rate of sorption depends on the pressure but at 10 atmospheres it increases about 3-fold as the temperature is increased from −78° to 0° and hardly at all between 0° and 25°. This behavior is due to the conflicting affects of lower surface concentration and higher diffusion coefficient with increasing temperature.

The useful capacity of the sieve increases with decreasing temperature, more so at lower pressures. The volume of gas retained in the free space of the bed increases with pressure both in an absolute sense and relative to the amount sorbed. Consequently, for optimum separation efficiency it is desirable to work at a low pressure and a temperature below 0° C. At high pressures (20–40 atmospheres or higher) there is little advantage to temperatures below 0° C.

EXAMPLE 2

Experimental separations were carried out in small columns.

Typical results are as follows:

Column dimensions: 58 cm. long x 1.38 cm. inside diameter. Measured volume: 91 cc.

Sorbent charge: 63 gm. Linde Molecular Sieve 4A 1/16" pellets.

Volume of free space in bed: 34 cc. (this is the volume exterior to the pellets which was used in calculating residence time. There is a further 18 cc. which consisted of relatively large voids between the crystallites making up the pellets. The actual contact times were consequently somewhat greater than the figures given below due to diffusion into these spaces).

Inlet gas composition: $N_2$, 10.0%; $CH_4$, 90.0%.

The sorption was carried out at constant pressure and temperature and the outlet gas stream was continuously analysed with a thermal conductivity cell. The desorption was performed by allowing the pressure to drop to atmospheric at constant flow rate while heating the column. During the sorption half cycle the decrease in nitrogen content reached a maximum very close to the start and then fell off gradually. The conclusion of the sorption period was chosen somewhat arbitrarily but was at about half of the maximum nitrogen reduction. The desorption was best carried out at a fairly high flow rate. This takes advantage of the higher rate of desorption of nitrogen so that the nitrogen is concentrated in the first fraction removed and the final gas evolved is enriched in methane. Consequently it is practical to stop the desorption when the analysis of the gas returns to that of the original mixture leaving the remaining small amount of gas to be included in the next sorption stage.

The results of several experiments are summarized below. Fractions 1 and 2 refer respectively to the methane-rich gas from the sorption step and the nitrogen-rich gas from the desorption step and are expressed on the basis of 1 gm. of sieve.

*Table 1*

| Temperature, Pressure | Contact Time, min. | Length of Sorption half-cycle, min. | Fraction 1 | | Fraction 2 | |
|---|---|---|---|---|---|---|
| | | | Volume, cc./gm. | Percent Nitrogen | Volume, cc./gm. | Percent Nitrogen |
| 0° C.; 40 atm | 4.23 | 12 | 73.0 | 6.9 | 65.5 | 13.4 |
| | 26.3 | 50 | 48.6 | 6.18 | 80 | 12.3 |
| 0° C.; 10 atm | 1.82 | 10 | 35 | 7.0 | 21.2 | 14.9 |
| | 13.2 | 40 | 19.4 | 5.2 | 29.7 | 13.2 |
| 0° C.; 2 atm | 0.62 | 10 | 20.7 | 8.4 | 5.2 | 16.4 |
| | 9.73 | 41 | 5.4 | 5.4 | 8.4 | 12.9 |
| −78° C.; 10 atm | 2.5 | 35 | 124 | 8.6 | 20.0 | 19.2 |
| | 5.1 | 56 | 100 | 8.0 | 20.7 | 18.7 |
| | 18.2 | 81 | 40 | 4.8 | 22.9 | 19.6 |
| −78° C.; 2 atm | 2.3 | 43 | 30.3 | 7.7 | 4.8 | 24.4 |
| | 11.8 | 115 | 16.0 | 3.35 | 6.0 | 27.7 |

The following conclusions may be drawn from these results.

(a) The decrease in nitrogen content in fraction 1 is greater with longer contact times although with this column there is relatively little gain at 0° for times greater than about 5 minutes. At very slow flow rates (long contact time) the column length may be a limiting factor—with this column a decrease in nitrogen content from 10% to 6% is the best to be expected with a contact time of 5 minutes at 0°.

(b) The higher the pressure, the greater the relative volume of fraction 2 (desorbed gas) and the lower its proportion of nitrogen. This is principally the result of dilution with the greater amount of gas in the free space of the bed. Consequently this type of operation is most promising at lower pressures.

(c) A marked increase in separation accompanied by a considerably slower rate is found at −78°. The useful capacity of the sieve is increased with pronounced increase in the nitrogen content of the desorbed gas.

In any actual operation the improved efficiency of the low temperature operation must be balanced against the added cost of refrigeration.

As mentioned above the desorption process, if carried out fairly rapidly affords an additional fractionating effect. The fastest desorption used in any of the experiments above was around 10 minutes. The rate of heating would probably provide a practical limit.

EXAMPLE 3

A batch type separation system consists of a cyclic operation involving two or more units. One or more units are sorbing while the others are regenerating. The experiments described above show that it is advantageous to carry out the regeneration quickly. In practice the length of the regeneration cycle will probably be determined by the rate of heating the unit and then of subsequently cooling it prior to the next sorption period. It should be possible to have the regeneration period shorter than the sorption period perhaps even half; in this latter case two units could be sorbing while one was regenerating.

The regeneration may be carried out as described in the experiments under Example 2 by allowing the pressure to fall to atmospheric while the unit is being heated to around 150° C., or it may be at the same pressure as the sorption. In the former case no flushing gas is needed since the nitrogen comes off first and the last gas is rich in methane.

In the latter case some flushing gas will be necessary although, due to the fractionation process during desorption, the amount will be less than to completely displace all of the gas in the free space of the bed at the description temperature. This flushing gas will be a portion of the purified gas and should be fed in a direction opposite to the feed. That is to say, the nitrogen-rich gas should be withdrawn from the feed inlet end while the flushing gas is fed into the feed outlet end as necessary to maintain the pressure.

When the concentration of nitrogen in the nitrogen-rich stream falls below a particular value determined by experience the flow is stopped, the unit is cooled rapidly and feed gas is introduced to start the sorption cycle. If the feed gas is cooled well below 0°, it will provide the major cooling for the sorbent bed.

This process may be carried out at any pressure but as shown in the experiments in Example 2, the nitrogen-rich stream is relatively smaller in volume and richer in nitrogen at lower pressures. Operation at lower temperatures enhances both of these effects as shown by the experiments at −78° C. Excessive lowering of the temperature is not desirable since the contact time will have to be increased to give equivalent nitrogen removal. The cost of refrigeration balanced against the increased efficiency of separation will determine the most economical temperature in any case.

It should be emphasized that this separation process is not based upon differential equilibrium adsorptions as with conventional adsorption separations using activated charcoal, silica gel, etc.; but is a differential rate sorption separation. For practical purposes there is no significant displacement of one gas by the other. For each gas the amount sorbed per unit weight of sorbent is directly proportional to time near the start of the sorption period, and increases more slowly afterwards according to the curves in Figure 1. Since pure methane is sorbed at a rate which is actually greater than that of the nitrogen in a 10% mixture, it is desirable to minimize passing the purified gas through the cooled sorbent bed. Consequently it may be desirable in removing a high proportion of nitrogen to use two or more stages, not attempting to effect the whole removal in the first stage. In each stage the contact time and total sorption period can be adjusted for optimum performance. The following method may be used to decrease the amounts of flushing gas required below those listed in the above table as minimum amounts.

EXAMPLE 4

A continuous process may be of the moving bed or fluidized bed type. The former uses relatively large particles which flow by gravity in a relatively direct path through the reactor. The latter uses fine particles, 20 mesh to 100 mesh, which are uniformly mixed and of which a portion is removed constantly for regeneration.

Since the preferential sorption of $N_2$ is due to diffusion to the interior of the particle, it is desirable to avoid too large a ratio of surface to volume. For this reason, as well as the positive control of particle flow and of contact time which are possible, the moving bed technique is preferable.

Figure 3 depicts apparatus suitable for a continuous sorption process of the counter-current moving bed type.

A suitable tower 1 is provided with inlet end indicated generally by the numeral 2 and outlet end indicated generally by the numeral 3, these referring to movement of the sorbent. The inlet end 2 is provided with cooling apparatus, 4, and the lower third of the tower 1 is provided with heating apparatus, 5 and a heating jacket 5a. The tower 1 is filled with particles of sorbent 6 which flow downwards under the influence of gravity as sorbent is removed from the outlet end 3. The gaseous mixture to be purified is admitted through pipe 7 which passes through a cooler 7a which may use the same refrigerant as cooling apparatus for the sorbent particles 4, and into the sorbent bed through a dispersing inlet 8. The flow of gas is upwards through the tower and the purified gas rich in methane is taken off through the pipe 9. Part of this methane-rich gas is diverted through the pipe 10, compressed somewhat in the compressor 10a and introduced at 11 into pipe 12 to gas-lift the particles of sorbent upwards from the outlet of the tower 3 to the inlet 2. Of course any other means such as a mechanical conveyor etc. may be used to elevate the sorbent. Part of the methane-rich gas is also reintroduced into the tower through the pipe 13 to displace the nitrogen-rich gas which is desorbed at the high temperature. Alternatively to using the purified gas for this purpose it is possible in some cases where the highest degree of purification is not required to use the original unpurified mixture in pipe 13. The nitrogen-rich gas is withdrawn through pipe 14 to be further processed if desired. A portion of the nitrogen-rich stream may be reintroduced to the tower just above the heater 5 via pipe 15. This acts to increase the concentration of nitrogen in the nitrogen-rich stream but since the sorption rates are low at this point due to the high concentration of sorbed gas only a relatively small amount may be treated in this fashion.

The apparatus is equipped with suitably placed temperature and pressure measuring devices and with analysers for the various gas streams. By proper regulation of the pressures at the various inlets and outlets the gas flows in the appropriate directions indicated by the arrows. The rate of flow of the nitrogen-rich fraction through pipe 14 relative to the other flows is adjusted to give a maximum nitrogen concentration in this stream. The flow returned to the tower by line 15 is adjusted so that the nitrogen concentration just below the main inlet 8 does not exceed that of the inlet gas.

Figure 4 depicts apparatus alternative in design to that depicted in Figure 3 and adapted to carry out the process in a concurrent manner.

This apparatus is based on co-current flow of gas and sorbent, a process which is inherently less efficient than the counter-current flow in the previous apparatus. However, it may be preferred in some cases due to somewhat greater simplicity of construction and operation.

A suitable tower, 25, is provided with inlet end indicated generally by the numeral 26 and outlet end indicated generally by the numeral 27. The inlet end, 26, is provided with a cooling apparatus 28 in which, most conveniently, a refrigerant is circulated around and between vertical tubes through which the contents of the tower flow. About one-third from the outlet end is a heating apparatus, 29, similar to the cooling apparatus 28 but having circulating steam in place of refrigerant. The bottom third of the tower is further heated by heating coils 29a. Tower 25 is filled with particles of sorbent, 30, to a level just above the cooling section, 28. The gaseous mixture to be purified is admitted at two places: through pipe 31 and inlet 31a where it serves to gas lift the particles of sorbent via pipe 32 from the bottom to the top of the tower 25 and through a cooling unit 33 and inlet 34 into the top of the tower. The feed admitted via 31 is at ordinary temperature and serves to partially cool the hot particles of sorbent from the heated section. Further cooling occurs in the cooler 28 and from the entry of additional cooled feed gas at 34. The cooling units 33 and 28 may be connected together for convenience in operation. The relative amounts of feed introduced at 31 and 34 may be varied through a considerable range provided that enough is introduced at 31 to give sufficient circulation of the sorbent.

The particles of sorbent and the gas both travel downwards from the top of the tower during which period preferential sorption of nitrogen takes place. Some sorption also occurs in pipe 32.

The purified gas, enriched in methane, is taken off through the pipe 35.

As the particles pass through the heating apparatus 29 and the lower heated section of the tower 27 desorption occurs and the desorbed gas, rich in nitrogen, is taken off through the pipe 36. As before this gas may be further processed if desired.

What I claim as my invention is:

1. A method for the removal of nitrogen from gaseous mixtures consisting mainly of methane, comprising: contacting the gaseous mixture with a suitable molecular sieve in which the interstitial and intracrystalline passages are such that the ratio of the rate of sorption to partial pressure is initially greater for nitrogen than for methane; removing the gaseous mixture from contact with said molecular sieve material before the proportion of sorbed methane to sorbed nitrogen exceeds a predetermined value and before equilibrium is approached; and recovering an unsorbed fraction of said gaseous mixture which is rich in methane and which contains a substantially reduced proportion of nitrogen.

2. A method for the removal of nitrogen from gaseous mixtures consisting mainly of methane, comprising: contacting the gaseous mixture with a suitable molecular sieve in which the interstitial and intracrystalline passages are such that the ratio of the rate of sorption to partial pressure is initially greater for nitrogen than for methane; removing the gaseous mixture from contact with said molecular sieve material before the proportion of sorbed methane to sorbed nitrogen exceeds a predetermined value and before equilibrium is approached; recovering an unsorbed fraction of said gaseous mixture which is rich in methane and which contains a substantially reduced proportion of nitrogen, and regenerating from said molecular sieve material a fraction of said gaseous mixture which is relatively rich in nitrogen.

3. Method according to claim 1, wherein said molecular sieve material comprises at least one particle of a dehydrated crystalline zeolite.

4. Method according to claim 1, wherein said molecular sieve material comprises at least one particle of mordenite.

5. Method according to claim 1, wherein said molecular sieve material comprises at least one particle of synthetic mordenite.

6. Method according to claim 1, wherein said molecular sieve material comprises at least one particle of synthetic zeolite.

7. Method according to claim 1, wherein said molecular sieve material comprises at least one particle of sodium aluminum silicate.

8. Method according to claim 2, wherein said regenerating is performed at a temperature of between about 100° C. and 200° C., and at a pressure no greater than that at which the sorption is performed.

9. A method for the removal of nitrogen from gaseous mixtures consisting mainly of methane, comprising: contacting the gaseous mixture with a first molecular sieve in which the interstitial and intracrystalline passages are such that the ratio of the rate of sorption to partial pressure is initially greater for nitrogen than for methane, removing the gaseous mixture from contact with said first molecular sieve material before the proportion of sorbed methane to sorbed nitrogen exceeds a predetermined value and before equilibrium is approached; recovering the unsorbed fraction of said gaseous mixture which is rich in methane and which contains a substantially reduced proportion of nitrogen; regenerating from said first molecular sieve material a second fraction of said gaseous mixture which is relatively rich in nitrogen; and further treating said second fraction for the recovery of methane therefrom.

10. The method of claim 9, wherein said further treating comprises contacting the second fraction with activated charcoal.

References Cited in the file of this patent

UNITED STATES PATENTS

| | | |
|---|---|---|
| 2,254,799 | Erdmann | Sept. 2, 1941 |
| 2,306,610 | Barrer | Dec. 29, 1942 |